Figure 1:
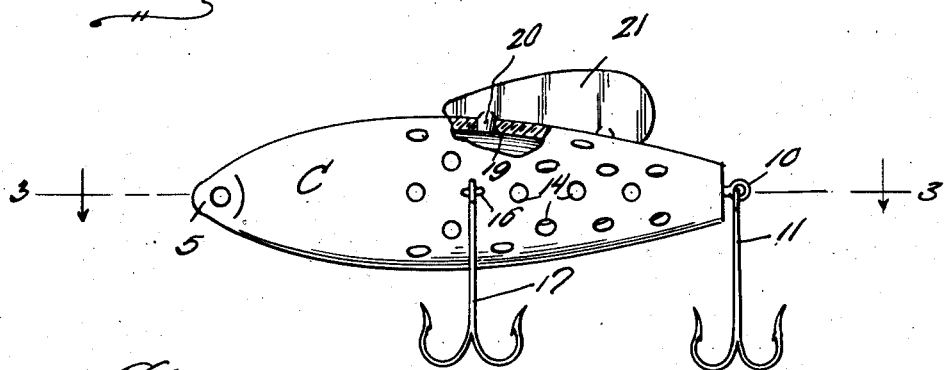

June 19, 1928.  1,673,978

F. GUINDON

FISH LURE

Filed Aug. 30, 1927

Inventor

Frank Guindon

By Clarence A O'Brien
Attorney

Patented June 19, 1928.

1,673,978

UNITED STATES PATENT OFFICE.

FRANK GUINDON, OF PLANKINTON, SOUTH DAKOTA.

FISH LURE.

Application filed August 30, 1927. Serial No. 216,401.

The present invention relates to a fish lure, and has for its prime object to provide a transparent casing for receiving bait, said casing being divided into compartments, one of which is closed at the front of the casing and contains air for buoyancy purposes, while the other compartment at the rear end is perforated for receiving the bait.

Another important object of the invention resides in the provision of a bait device of this nature which is exceedingly simple in its construction, inexpensive to manufacture, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 2:
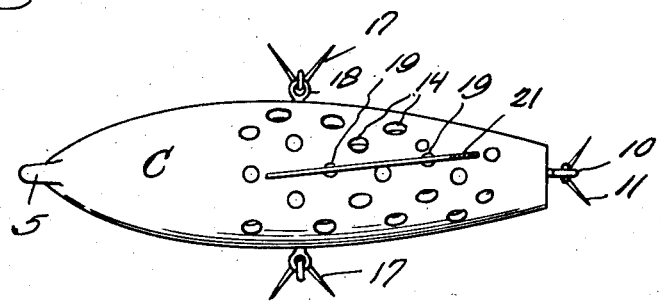
Figure 3:
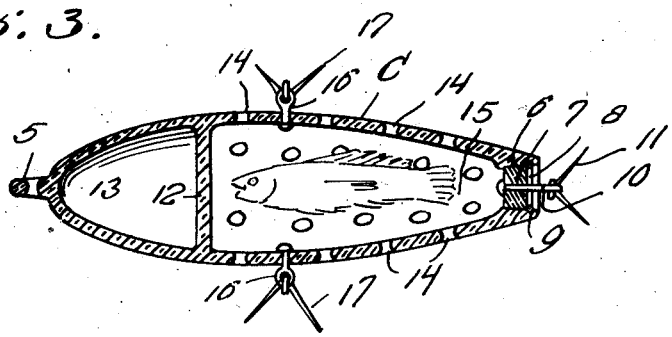

Fig. 1 is an elevation of the device embodying the features of my invention, showing a portion in section, Figure 2 is a top plan view thereof, and Figure 3 is a longitudinal section therethrough taken substantially on the line 3—3 of Figure 1.

Referring to the drawing in detail it will be seen that I provide an elongated oblong curvilinear casing C of glass or other suitable transparent material. The nose or front end of the casing C is formed with an eyelet 5 so that the trawling line may be attached thereto. The rear end of the casing has an opening 6 for receiving a closure plug 7 which is held in place by a resilient ring 8 which fits in a groove 9 provided in the opening 6 for this purpose. An eyelet rivet or bolt 10 is engaged in the closure plug 7 and has attached thereto a hook structure 11 of any preferred formation.

A transverse partition 12 is formed integrally across the front portion of the casing 6 to form a forward compartment 13 to contain air so that the forward portion of the casing will be more buoyant than the rear portion thereof. The rear portion of the casing is perforated as at 14 to allow water to fill the same so that the bait in the rear compartment 15 may live. Eyelet rivets or bolts 16 are engaged with the rear portion of the casing and have attached thereto hook structures 17 of any preferred formation.

The rear portion of the casing is provided with a pair of apertures 19 for receiving pin 20 projecting from a fin 21 which is disposed diagonally to the axis of the casing so that as the casing is pulled through the water a whirl will be imparted thereto.

When the casing is pulled through the water by the usual process of trawling it will whirl as will be well understood by those skilled in this art because of the fin 21, and live bait situated in the compartment 15 will be visible because of the transparent nature of the casing and therefore will attract the fish. In this way the fish may be caught, using the same bait over and over again. The bait will be able to live in the water because of the perforations 14. Minnows, gold fish, frogs, or like bait may be used. The buoyancy imparted to the forward end of the casing is very important since it assists greatly in the whirling thereof, and causes the front end to rise so that the axis of the casing is disposed vertically when stationary in the water.

It is thought that the construction, utility, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described the invention, what I claim as new is:—

1. A bait apparatus of the class described comprising an oblong curvilinear casing of transparent material having a transverse partition formed therein to divide the same into a front compartment and a rear compartment, said front compartment having air therein to afford buoyancy to the front end of the casing, the rear compartment having its wall perforated to admit water so that bait therein may live.

2. A bait apparatus of the class described comprising an oblong curvilinear casing of transparent material having a transverse partition formed therein to divide the same into a front compartment and a rear compartment, said front compartment having air therein to afford buoyancy to the front end of the casing, the rear compartment having its wall perforated to admit water so that bait therein may live, the rear end of the rear compartment being open, a closure plug in the opening, a ring for holding the plug in place seatable in the groove formed in the opening.

3. A bait apparatus of the class described comprising an oblong curvilinear casing of transparent material having a transverse partition formed therein to divide the same into a front compartment and a rear compartment, said front compartment having air therein to afford buoyancy to the front end of the casing, the rear compartment having its wall perforated to admit water so that bait therein may live, the forward end of the casing being provided with an eye to attach thereto a trawling line.

4. A bait apparatus of the class described comprising an oblong curvilinear casing of transparent material having a transverse partition formed therein to divide the same into a front compartment and a rear compartment, said front compartment having air therein to afford buoyancy to the front end of the casing, the rear compartment having its wall perforated to admit water so that bait therein may live, the rear end of the rear compartment being open, a closure plug in the opening, a ring for holding the plug in place seatable in the groove formed in the opening, the forward end of the casing being formed with an eye to receive a trawling line, a plurality of hook structures, and means for engaging the hook structures to the rear of the casing and the closure plug.

5. A bait apparatus of the class described comprising an oblong curvilinear casing of transparent material having a transverse partition formed therein to divide the same into a front compartment and a rear compartment, said front compartment having air therein to afford buoyancy to the front end of the casing, the rear compartment having its wall perforated to admit water so that bait therein may live, the rear portion of the casing having its walls formed with two openings, a fin having a pair of pins receivable in the two openings so as to be disposed diagonally to the axis of the casing so that when the casing is pulled through the water a whirl will be imparted thereto.

In testimony whereof I affix my signature.

FRANK GUINDON.